US007480651B1

(12) United States Patent
Matthiesen et al.

(10) Patent No.: US 7,480,651 B1
(45) Date of Patent: Jan. 20, 2009

(54) SYSTEM AND METHOD FOR NOTIFICATION OF GROUP MEMBERSHIP CHANGES IN A DIRECTORY SERVICE

(75) Inventors: Brian R. Matthiesen, Rancho Santa Margarita, CA (US); Dennis R. Doll, Newport Beach, CA (US); Bassam Hassoun, Riverside, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/125,966

(22) Filed: May 23, 2008

(51) Int. Cl.
G06F 7/00 (2006.01)
(52) U.S. Cl. .................... 707/3; 370/395.54; 726/1
(58) Field of Classification Search .................. None
See application file for complete search history.

(56) References Cited

U.S. PATENT DOCUMENTS 5,768,519 A * 6/1998 Swift et al. ................ 709/223
6,418,453 B1 7/2002 Kraft et al.
6,829,639 B1 * 12/2004 Lawson et al. ............. 709/224
2005/0089048 A1 * 4/2005 Chittenden et al. ...... 370/395.54
2005/0239405 A1 * 10/2005 Myyry et al. ............. 455/41.2
2008/0109870 A1 * 5/2008 Sherlock et al. ................ 726/1

OTHER PUBLICATIONS

Cai et al., "Synthesizing Client Load Models for Performance Engineering via Web Crawling", Nov. 5-9, 2007, ASE'07, ACM, pp. 353-362.*

* cited by examiner

Primary Examiner—Sathyanarayan Pannala
(74) Attorney, Agent, or Firm—Leveque IP Law, P.C.

(57) ABSTRACT

A method and system provides for a computationally efficient approach to monitor group changes, or events, on a directory service. Group events are monitored by use of a domain crawler launched by an event monitoring process of an identity management (IdM) system that gathers group event data and reports the collected and consolidated changes to the IdM system.

1 Claim, 2 Drawing Sheets

SYSTEM AND METHOD FOR NOTIFICATION OF GROUP MEMBERSHIP CHANGES IN A DIRECTORY SERVICE

BACKGROUND

A critical function of identity management (IdM) systems is the ability to ensure that each domain user account has only the privileges allowed by business policy controls. To detect these access authority violations, it is essential that an IdM system detect changes to the managed systems, such as Windows Active Directory by Microsoft, and assess the changes against the business policy controls.

Active Directory is particularly difficult to monitor for access authority changes. When an Active Directory user account is added or removed from security groups, for example, the actual object that is affected is the group (member list). The user account is not directly updated and therefore the typical IdM change log monitoring of the user accounts does not detect security group changes.

Approaches to address this shortcoming are computationally inefficient or not appropriate for use with IdM systems. Active Directory LDAP change notification is an approach that requires the user to register with the domain controller to receive change notifications. The notifications are based on an LDAP search filter and are relative to a single base point. Due to the overhead required, it is not recommended to use Sub Tree scope. In addition, Sub Tree scope is only supported at the root node. This means that a notification result would be generated for every changed object in the domain resulting in notification of many thousands of irrelevant events. There is also a severe performance impact on Active Directory, particularly the significant overhead on the domain controllers. As stated in Microsoft's online help for Visual Studio: "Although the subtree scope is supported if the base object is the root of a naming context, its use can severely impact server performance, because it generates an LDAP search result message every time an object in the naming context is modified. You cannot specify LDAP_SCOPE_SUBTREE for an arbitrary subtree."

Another approach uses the DirSync search control of Active Directory, which requires a full search request after which a "cookie" that is used for subsequent searches is received. By presenting the cookie on a subsequent search, only objects changed since the last search are returned. The approach is not suitable for use by an IdM because it does not detect changes to the user access authority changes (i.e. changes to the group membership). When a user object is added or removed from a group (thus affecting the "memberOf" attribute), that user object is not reported as changed. This type of search will return the group object, since it was the group object that actually changed (member list updated). The change event does not contain details on the addition and removal of the members. This information can only be determined by maintaining a local copy of the member list and performing a before/after comparison with the current list. Since many groups contain most or all of the user objects (e.g. Domain Users), there could be potentially millions of member entries to compare.

BRIEF SUMMARY

In accordance with embodiments consistent with the present invention, a method and system provides for monitoring group events on a directory service. An event monitoring process of an identity management (IdM) system launches a domain crawler to query the directory service in a directory service domain. The domain crawler enumerates a plurality of domain controllers in the directory service domain. For each domain controller of the plurality of domain controllers, an event log of the domain controller is queried and group event data is gathered. The group event data for each domain controller of the plurality of domain controllers queried is consolidated to generate a group change list organized by user accounts of a group of users. For each user account in the group change list, the domain crawler sending an update notification of changed group access authority to an identity manager server of the identity management system.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

In accordance with embodiments consistent with the present invention, a method and apparatus provides for a computationally efficient approach to locating and evaluating group changes, such as security group events, on a directory service. Directory service changes, referred to as events, are monitored by use of a domain crawler launched by an event monitoring process of an identity management (IdM) system that gathers group event data and reports the collected and consolidated changes to the IdM system. The domain crawler is a program that gathers and categorizes information in a domain; in this sense, a domain crawler is similar to a web crawler program that gathers and categorizes information on the Internet or world wide web (www). The domain crawler enumerates and scans Windows Domain Controllers (DCs) and consolidates security group membership events to facilitate analysis of access authority violations. Algorithms for enumerating the DCs in the Windows domain and for consolidating the group events across a plurality of DCs are provided.

The method and system for monitoring group events is especially appropriate for locating and evaluation security group changes on Active Directory®, a directory service by Microsoft. As previously mentioned, previous approaches for detecting Active Directory events have proven to be computationally inefficient or inappropriate for use by IdM systems. These problems are mitigated by the various embodiments described herein.

Figure 1:
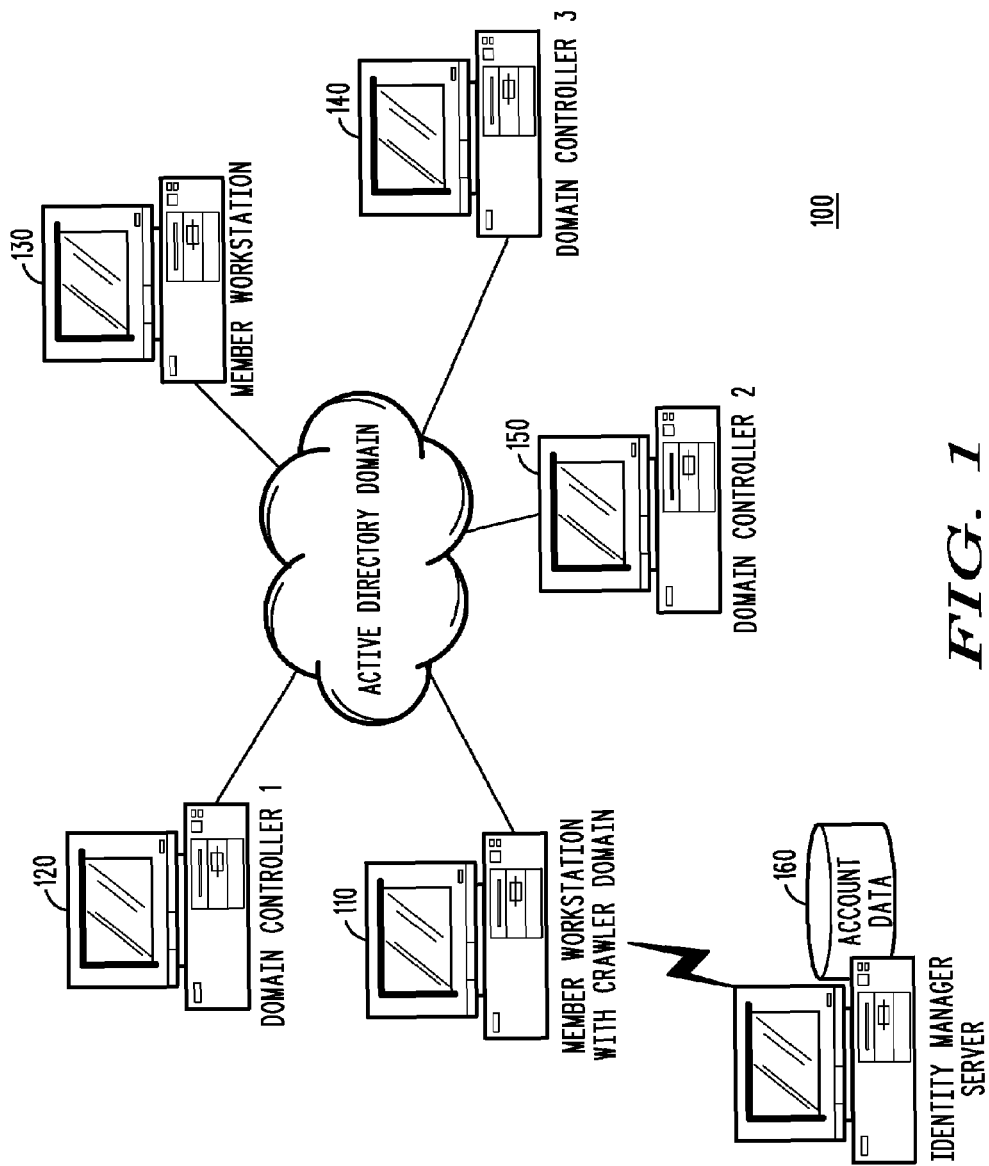
FIG. 1 is a block diagram of a system, in accordance with various embodiments disclosed herein.

Referring now to system block diagram 100 of FIG. 1 of the drawings, an identity management (IdM) system is shown. IdM system 100 is comprised of a workstation equipped with domain crawler 110, a member workstation without a crawler 130, domain controllers 1, 2, 3 (120, 140, 150), and an identity manager server with a storage unit, such as account database 160 as shown. The system components are in operable communication with one another via communications links between the various devices and computers connected together within system 100. The system may include connections, such as wire, wireless communication links, or fiber optic cables.

It should be noted that system 100 may include additional servers, clients, and other devices not shown. The workstations and domain controllers illustrated in FIG. 1 may, for example, be personal computers or network computers. FIG. 1 is intended as an example, and not as an architectural limitation for the different illustrative embodiments.

The member workstation 110 with the domain crawler is in operable communications with the identity manager server 160 as shown. The domain crawler has algorithms for enumerating the domain controllers 120, 140, 150 and for consolidating the group events across the domain controllers 120, 140, 150.

The domain crawler of member workstation 110 runs as a background process on the workstation. It periodically enumerates the Domain Controllers (DCs) in the Active Directory domain comprised of domain controllers 120, 140 and 150. The Domain Crawler scans the event log on each domain controller for group membership change events. The Domain Crawler then sends notification messages to the identity manager server 160 of IdM system 200.

Member workstation 110 with domain controller is an example of a computer in which computer usable program code or instructions implementing the processes may be located for the illustrative embodiments. The programmable code or instructions are located on storage devices of the workstation 110 or identity manager server 160 and may be loaded into main memory of workstation 110 for execution by its processing unit. The processes of the illustrative embodiments may be performed by a processing unit using computer implemented instructions, which may be located in a memory such as, for example, main memory, ROM, or in one or more peripheral devices. A memory may be, for example, main memory or a cache such as found in an interface/MCH. A processing unit may include one or more processors or CPUs. The depicted examples in FIGS. 1-2 are not meant to imply architectural limitations.

Figure 2:
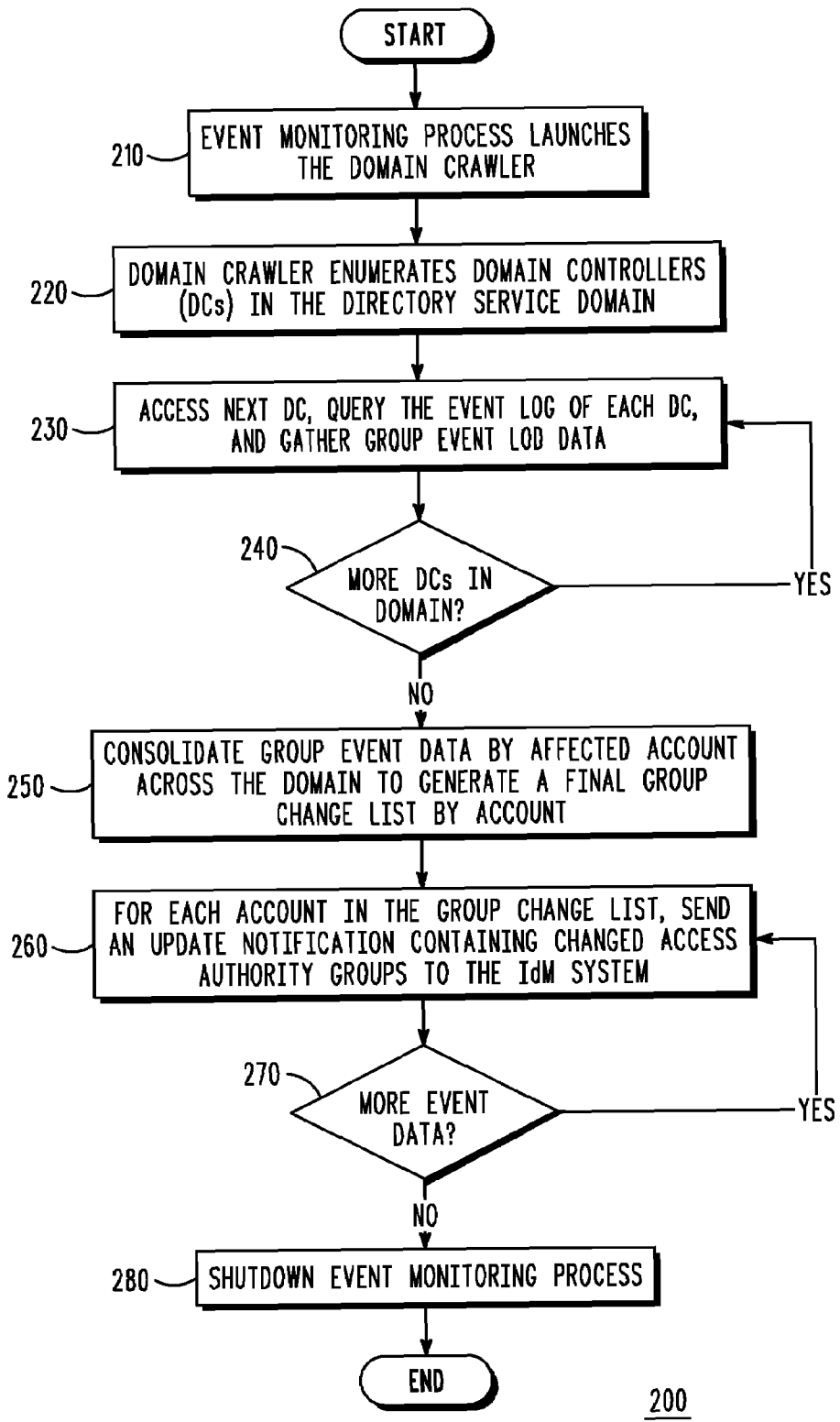
FIG. 2 is a flowchart that illustrates an exemplary flow of a computationally efficient method of monitoring group changes on a directory service, in accordance with various embodiments disclosed herein.

Referring now to flow 200 of FIG. 2, an exemplary method for monitoring group events of a directory service, such as Microsoft's Active Directory®, is shown. At Block 210, an event monitoring process, such as Event Notification of Active Directory® launches the domain crawler in order that it might query the directory service and enumerate domain controllers in the domain. At Block 220, the domain crawler enumerates domain controllers (DCs) in the directory service domain. The loop comprised of Blocks 230 and 240 illustrates that for each domain controller DC, the DC is accessed, its event log is queried and group event data of the DC is gathered. At Block 250, the group event data for each domain controller of the plurality of domain controllers queried is consolidated to generate a group change list organized by user accounts of a group of users. At Block 260, for each user account in the group change list, the domain crawler sending an update notification of changed group access authority to an identity manager server of the identity management system. Decision Block 270 causes this to be performed for all event data collected. At Block 280, the event monitoring process, i.e. Event Notification, is shutdown.

The method and system described herein in conjunction with various exemplary embodiments is superior to prior art approaches, since the log entries detected at Block 230 include all the required information, including the account object, of the groups affected and whether they were added or deleted. This allows the updates to be sent to the IdM system without incurring further overhead of additional data lookups. Moreover, it does not impose significant overhead on the domain controllers and can detect group membership changes for any user in the domain.

It is further envisioned that the method and system described herein may be embodied as an additional C/C++ module to existing IdM Windows Active Directory® Adapter. The Event Notification process of the Adapter launches the domain crawler to query Active Directory® and to enumerate the Domain Controllers (DC) in the domain. The process then queries the Event Log of each DC and extracts the group event data. These group events are consolidated from across the domain to produce a final list of group changes by account. For each account in this group change list, the IdM system is sent an update notification containing the added/removed access authority group(s).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A computer-implemented method for monitoring group events on a directory service, comprising:

a group membership event monitoring process of an identity management (IdM) system launching a domain crawler to query the directory service in a directory service domain;

the domain crawler enumerating a plurality of domain controllers in the directory service domain; for each domain controller of the plurality of domain controllers:

querying an event log of the domain controller for group membership changes; and gathering group membership event data of the domain controller;

consolidating the group membership event data for each domain controller of the plurality of domain controllers queried to generate a group membership change list organized by user accounts of a group of users;

for each user account in the group membership change list, the domain crawler sending an update notification of changed group membership access authority to an identity manager server of the identity management system.

* * * * *